Patented Nov. 27, 1923.

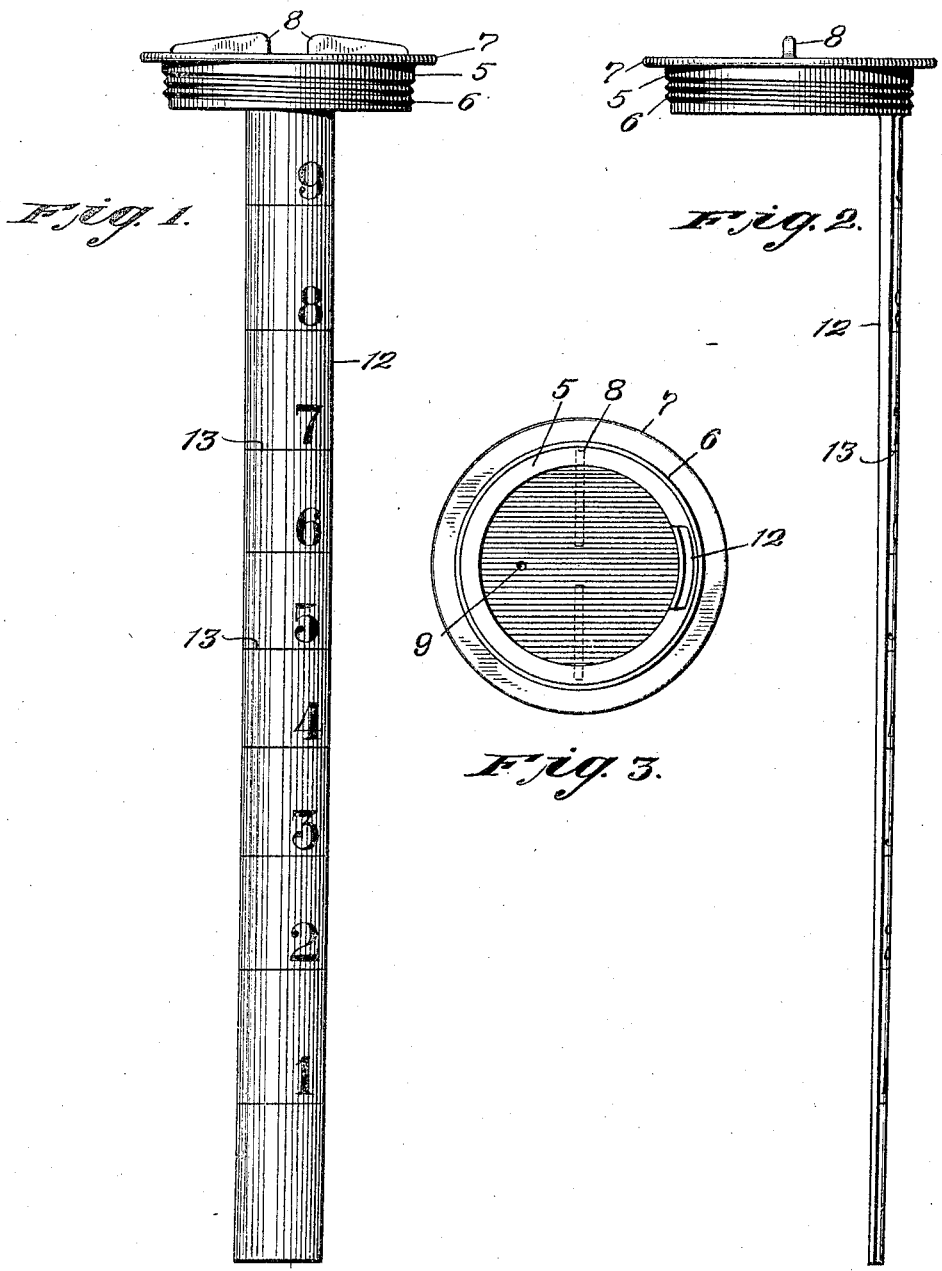

1,475,183

UNITED STATES PATENT OFFICE.

JOHN FRANCIS HARWOOD, OF NEW YORK, N. Y., ASSIGNOR TO AMERICAN GAUGE COMPANY, INCORPORATED, OF NEW YORK, N. Y., A CORPORATION OF NEW YORK.

TANK CAP.

Application filed September 26, 1921. Serial No. 503,409.

*To all whom it may concern:*

Be it known that I, JOHN FRANCIS HARWOOD, a citizen of the United States, residing in the city of New York, county of New York, and State of New York, have invented certain new and useful Improvements in Tank Caps, of which the following is a specification.

This invention relates to tank caps and particularly to those used on the gasoline tanks of motor driven vehicles such as automobiles, motor boats, aeroplanes, etc., although it is equally applicable to tanks used in other connections.

In the more expensive grades of motor driven vehicles, the gasoline tank is often provided with a gauge actuated by a float which at all times indicates the amount of gasoline in the tank. In the cheaper grades of vehicles, however, the considerable cost of such a gauge is not warranted, and it is not provided. In such vehicles, it is the custom to keep a "measuring stick," usually of wood, which can be inserted into the tank when the cap is removed and which, after being wet by the gasoline, can be removed and will give a visual indication of the amount of liquid in the tank. Such measuring sticks are, however, a continual source of aggravation to the user of a motor vehicle owing to the liability of their becoming lost, mislaid, broken or dirty, the latter defect being particularly objectionable owing to the trouble that is likely to result if dirt is introduced into a tank from which gasoline is to be fed through a carbureter to an internal combustion engine.

In motor driven vehicles it is also the custom to use types of gasoline tank caps which are easily mislaid or lost, and which may be left in a dirty or dusty place while the tank is being filled and may thus serve to introduce dirt into the tank when they are replaced.

It is the general object of this invention to provide a new and improved tank cap which will serve also as a device for measuring the amount of liquid in the tank, and one which will be free from the objections hereinbefore mentioned as now existing in connection with the measuring sticks and tank caps now in use.

In carrying out the invention, I provide a tank cap near its outer edge with a projecting member adapted to extend into the tank and be wet by its contents, said projecting member being preferably provided with a scale calibrated according to the capacity of the tank. When the cap and the projecting member are removed from the tank, the extent to which the projecting member has been wet by the contents of the tank gives a visual indication of the amount of liquid in the tank. After the amount of liquid in the tank has thus been determined, the projecting member may be re-inserted in the tank and by reason of the fact that said member is attached to the cap near its outer edge, the cap may be left on the top of the tank and over to one side of the tank opening, thereby leaving the latter almost entirely exposed for filling purposes. The chances of losing the cap and the measuring stick and of introducing dirt into the tank when the cap is replaced or the measuring stick is inserted, are thus reduced to a minimum. The user of my improved tank cap soon forms a habit of lifting the cap and the projecting member only momentarily from the tank and then immediately returning it thereto, thereby avoiding all of the objections hereinbefore mentioned which are incident to the use of a separate cap and measuring stick.

The invention will be understood from the following description of one embodiment thereof, taken in connection with the accompanying drawings in which Figure 1 is a front elevation of the device; Figure 2 is a side elevation thereof; and Figure 3 is a bottom plan view thereof.

Referring to the drawings, the tank cap portion of the device, which may be of any suitable and well known form, is shown as comprising a body portion 5 provided with threads 6 adapted to engage threads in the opening in the tank, and provided with a flange 7 and upwardly projecting wings 8. The cap may also be provided with the usual air vent 9.

This tank cap is provided on its inner side, preferably near its edge, with a projecting member 12 adapted to extend into the tank and be wet by its contents. The member 12 is long enough to extend nearly to the bottom of the tank when the cap is screwed in place; and is preferably provided with a scale calibrated according to the capacity of the tank. The member 12 which is preferably of metal may be either integral with the cap portion of the device or may be made separate and secured thereto; and while the cross-sectional form of the member 12 is not highly important, it is preferably such that the outer surface of the member 12 is concentric with the circular edge of the cap portion, as best shown in Figure 3. The scale divisions 13 on the member 12 may be on either the outer or inner surfaces thereof, or on both, and are preferably formed directly in the member 12, although they may be applied in any other manner if desired. Of course, the scale may indicate either the proportional capacity of the tank, or its capacity in units of measurement such as gallons.

While I have shown one form in which my invention may be embodied, I wish it to be understood that in the appended claims I intend to cover any modified forms which come within the spirit of the invention.

What I claim is:

1. A cap, adapted to serve as a removable closure for the filling opening of a fuel tank, provided on its inner side with a projecting member located adjacent the outer edge of the cap and adapted to extend into the tank and be wet by its contents whereby the amount of liquid in the tank may be gauged by withdrawing the cap and projecting member from the tank and observing the level to which the projecting member is wet, and whereby, during filling of the tank the cap may be laid on the top of the tank adjacent the filling opening with the projecting member against the edge of the filling opening and extending into the tank thus leaving the filling opening unobstructed.

2. A cap, adapted to serve as a removable closure for the filling opening of a fuel tank, provided on its inner side with a projecting member located adjacent the outer edge of the cap and adapted to extend into the tank and be wet by its contents, and provided with a scale calibrated according to the capacity of the tank whereby the amount of liquid in the tank may be gauged by withdrawing the cap and projecting member from the tank and observing the level to which the projecting member is wet, and whereby, during filling of the tank the cap may be laid on the top of the tank adjacent the filling opening with the projecting member against the edge of the filling opening and extending into the tank thus leaving the filling opening unobstructed.

In testimony whereof I have affixed my signature to this specification.

JOHN FRANCIS HARWOOD.